United States Patent [19]

Reusens

[11] Patent Number: 5,657,355

[45] Date of Patent: Aug. 12, 1997

[54] SIGNAL PROCESSOR MODULE

[75] Inventor: Peter Paul Frans Reusens, Laarne, Belgium

[73] Assignee: Alcatel N.V., Rijswijk, Netherlands

[21] Appl. No.: 561,445

[22] Filed: Nov. 21, 1995

[30] Foreign Application Priority Data

Dec. 22, 1994 [EP] European Pat. Off. ............ 94203725

[51] Int. Cl.$^6$ .................................................. H03D 1/00
[52] U.S. Cl. ........................ 375/340; 329/304; 375/261
[58] Field of Search ............................ 375/341, 261, 375/286, 287, 340; 371/43, 44, 45; 327/304, 306, 307

[56] References Cited

U.S. PATENT DOCUMENTS

| | | | |
|---|---|---|---|
| 4,571,550 | 2/1986 | Head | 329/109 |
| 4,648,100 | 3/1987 | Mardirosian | 375/370 |
| 4,679,227 | 7/1987 | Hughes-Hartogs | 379/98 |
| 4,687,999 | 8/1987 | Desperben et al. | 329/109 |
| 4,958,360 | 9/1990 | Sari | 375/341 |

FOREIGN PATENT DOCUMENTS

| | | |
|---|---|---|
| 0200271 | 11/1986 | European Pat. Off. . |
| 0309038 | 3/1989 | European Pat. Off. . |
| 0571788 | 12/1993 | European Pat. Off. . |

*Primary Examiner*—Tesfaldet Bocure
*Assistant Examiner*—Bryan Webster
*Attorney, Agent, or Firm*—Ware, Fressola, Van Der Sluys & Adolphson LLP

[57] ABSTRACT

The present invention concerns a signal processor module (SPU,AVF) which is adapted to check if a received vector (RV) representing a received signal in a QAM signal vector plane is located in the intersection zone of a first and second zone (ABCDEF,ab) of this signal vector plane. The intersection zone is well chosen so that the phase angle difference (Da) between the received vector (RV) and an expected vector (EV) which represents a signal which should have been received instead of the received signal and which is located in the intersection zone, is limited.

7 Claims, 2 Drawing Sheets

SIGNAL PROCESSOR MODULE

TECHNICAL FIELD

The present invention relates to a signal processor module adapted to check if a vector representing a received signal, is located in a predetermined zone of a signal vector plane.

BACKGROUND OF THE INVENTION

Such a signal processor module is already known in the art, e.g. from the U.S. Pat. No. 4,697,227. Therein, the signal processor which is referred to as tracking system, checks if the received vector is located in a square centered around the constellation point i.e. the end point of an expected vector, representing a signal which should have been received instead of the really received one. The signal processor uses the position of the received vector with respect to the expected vector to determine the attenuation and frequency offset to which the signal represented by the received vector has been submitted. More in particularly, the averaged phase angle difference between the received and expected vector is indicative of this frequency offset.

A major drawback of the shape of the square is that the phase angle difference may be very high e.g. in the case of the end point of the received vector lying in a corner of the square. An occasional high phase angle difference may result in the above mentioned averaged phase angle difference which wrongly indicates a certain frequency offset. Although the U.S. Pat. No. 4,697,227 mentions arbitrarily shaped zones, it is not described how a zone needs to be shaped in order to overcome the above mentioned drawback, nor is it described how such a zone can be achieved.

DISCLOSURE OF INVENTION

An object of the present invention is to provide a signal processor module of the above known type but which is adapted to check if the received vector is located in a predetermined zone having such a shape that the above mentioned drawback is overcome.

According to the invention, this object is achieved due to the fact that said signal processor module includes first checking means to check if said vector is located in a first zone delimited by succesive orthogonal line segments, second checking means to check if said vector is located in a second zone delimited by two lines, and gating means coupled to said first and second checking means to determine if said vector is located in said predetermined zone equal to the intersection zone of said first and second zones.

Indeed, the two lines may be chosen so that the vectors lying in the intersection zone necessarily have a limited phase angle difference.

A characteristic feature of the present invention is that said first checking means performs said check by comparing orthogonal coordinate values representing said vector with orthogonal coordinate values of corner points of said first zone.

Another characteristic feature of the present invention is that said signal processor module further includes conversion means intercoupling said first and said second checking means and adapted to convert said orthogonal coordinate values of said vector to a phase angle value indicative of the phase angle difference between said vector and a predetermined vector.

In this way, the orthogonal coordinates are converted to an angular coordinate i.e. the phase angle difference, so that the second zone may be determined based on the above angular coordinate.

Yet another characteristic feature of the present invention is that said two lines are secant in the origin of said signal vector plane and that said predetermined vector lies on the bissectrice of said two secant lines.

In this way the second zone is shaped symmetrically with respect to the predetermined vector.

Further characteristic features of the present invention are that said second checking means performs said check by comparing said phase angle value with the phase angle between said bissectrice and one of said secant lines, and with the opposite of said phase angle and that said first and said second checking means have respective first and second control outputs indicating if said vector is located within said first and second zones respectively, and that both said control outputs are gated by said gating means.

Finally the signal processor module according to the invention provides an averaged phase angle value due to the fact that said signal processor module further includes averaging means (AVF) coupled to said second checking means and to an output of said gating means, said averaging means being adapted to average said phase angle value according to said output of said gating means.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
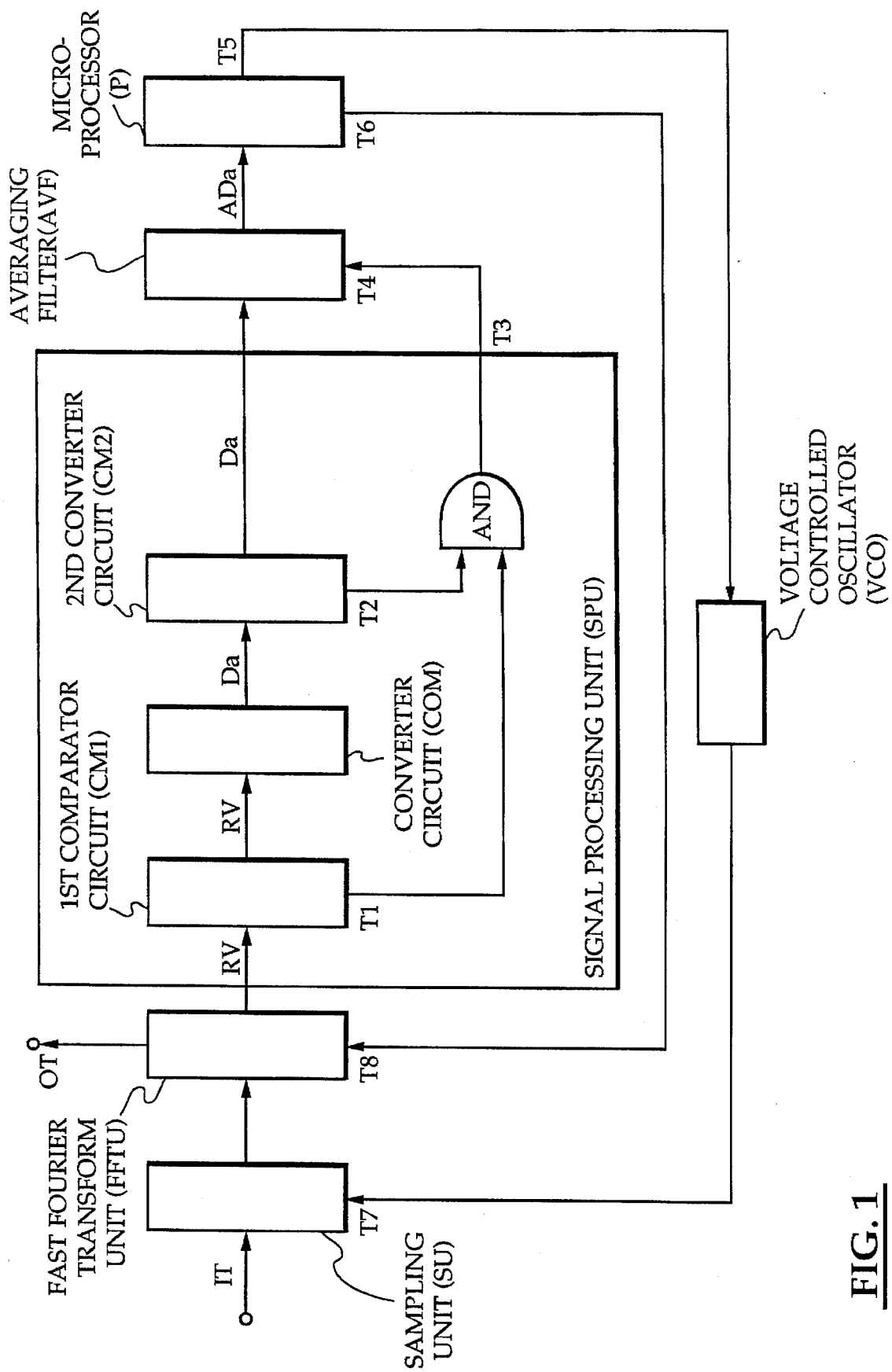
FIG. 1 represents a signal processor including a signal processor module according to the present invention.

Referring to FIG. 1, the signal processor shown therein includes the cascade connection of a sampling unit SU having an input terminal IT, a Fast Fourier Transform unit FFTU having an output terminal OT, a signal processor unit SPU, an averaging filter AVF and a microprocessor P. A first output terminal T5 of P is fed back to a control terminal T7 of SU via a voltage controlled oscillator VCO and a second output terminal T6 of P is directly fed back to a control terminal T8 of FFTU. An output terminal T3 of SPU is connected to a control terminal T4 of AVF. The signal processor module according to the invention is constituted by the cascade connection of the SPU unit and the AVF filter.

More in detail, the signal processor unit SPU includes the cascade connection of a first comparator circuit CM1, a convertor circuit COM and a second comparator circuit CM2. An output terminal T1 of CM1 and an output terminal T2 of CM2 constitute the inputs of an AND-gate AND having an output terminal constituting terminal T3 of SPU.

The signal processor shown in FIG. 1 is adapted to process a so called Discrete Multi Tone or DMT input signal. A DMT signal comprises a number of quadrature amplitude modulated frequencies or tones occurring during successive equal symbol intervals. The DMT technique is well described in the above US patent. One of the above tones or Pilot tone is used by the signal processor to track the starting points of each symbol interval. As is explained later on, the signal processor samples the DMT input signal received at IT and it is of the utmost importance that predetermined sampling instants coincide with the starting points of the symbol intervals. To this end, the signal processor adjusts the sample frequency Fs in the sample unit SU and corrects possible misalignment of predetermined sample instants with the above starting points of the symbol intervals, in the Fast Fourier Transform unit FFTU.

It is well know to a person skilled in the art how the above misalignment and sample frequency are corrected using the Pilot Tone and therefor only the basic idea behind it is explained hereafter. Let's e.g. suppose that the Pilot Tone $\sin(2\pi.t/T)$ is transmitted during the symbol interval T, t being the time interval elapsed since the starting point of the latter symbol interval. The first sampling instance during the above symbol interval occurs e.g. with a delay dT with respect to t=O. This time delay dT is equivalent with a phase angle error $dF=2\pi.dT/T$ for the Pilot Tone. One may correct the delay dT in the FFTU unit by performing a phase angle correction n.dF for a tone with frequency n/T. The averaged phase angle error is normally used to perform the latter correction. This averaged phase angle error also indicates a possible sample frequency error which may be accordingly adjusted via the VCO. However, if this value is corrupted by occasional high phase angle errors, the signal processor may wrongly correct a phase error or a frequency error and as a consequence the overal operation of the signal processor may be erroneous. The signal processor module according to the present invention, solves this problem through providing an averaged phase angle error which not sensitive to occasional large phase errors of the pilot tone.

Figure 2:
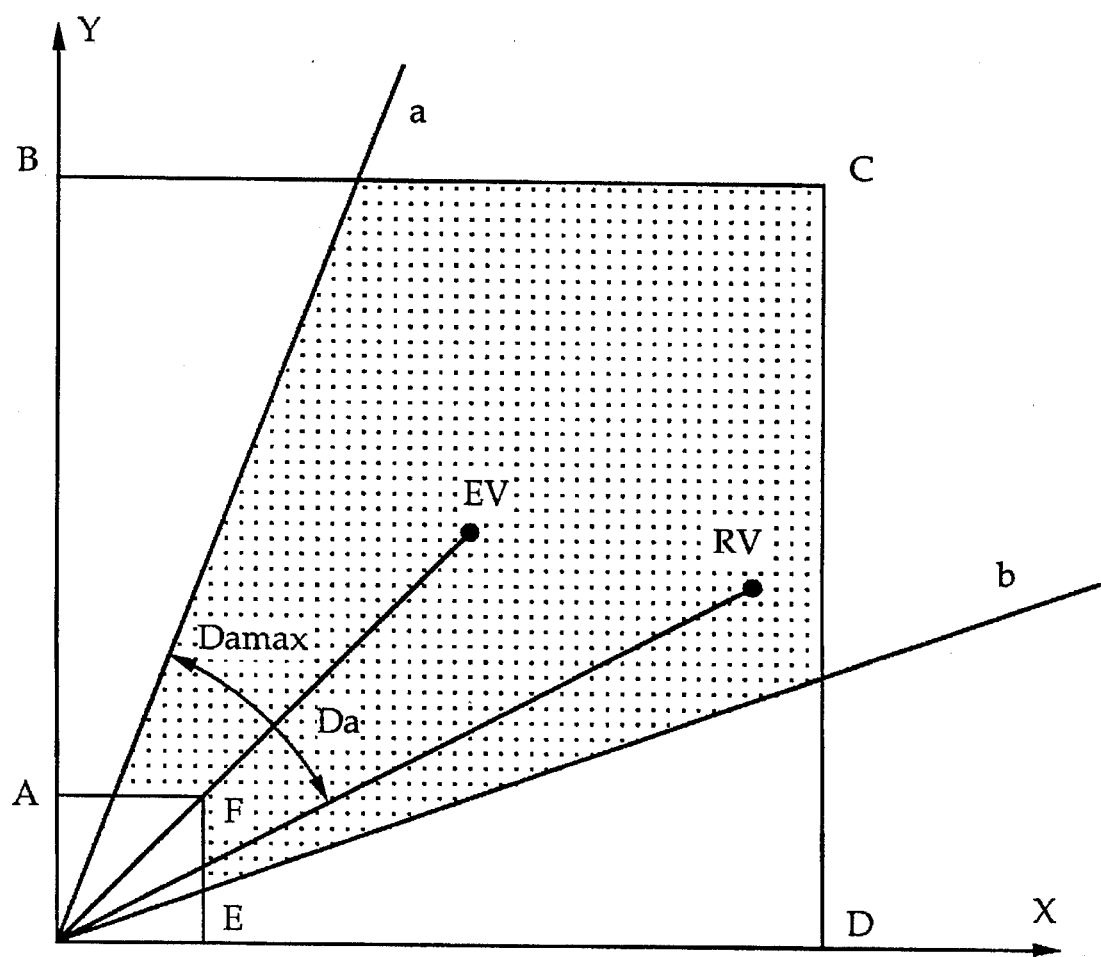
FIG. 2 shows the hatched intersection zone of two zones within a Quadrature Amplitude Modulation or QAM signal vector plane.

Referring to FIG. 2, a vector EV represents the expected Pilot Tone in a QAM signal vector plane having a orthogonal X and Y axis. A vector RV represent the Pilot Tone which is received at the input terminal IT. The hatched zone is the intersection of a first zone ABCDEF, delimited by consecutive orthogonal line segments, and a second zone ab, delimited by two secant lines of which the bissectrice coincides with an expected vector EV which represents the Pilot Tone which should have been received under ideal conditions. Da is the phase angle difference between EV and RV and Damax is half of the angle between the two secant lines a and b.

The operation of the signal processor is described hereafter.

The DMT input signal which is applied to the signal processor input IT is sampled at a sample frequency Fs in the sample unit SU. This sample frequency Fs is regulated via the control input T7 which constitutes an oscillator output of the voltage controlled oscillator VCO. The thus sampled DMT input signal is supplied during the symbol intervals by the sample unit SU to the Fast FoUrier Transform unit FFTU which calculates the orthogonal coordinates in the QAM signal plane of each vector representing a tone present in the DMT input signal during such a symbol interval. For instance, for the Pilot Tone, the FFT unit calculates the X,Y orthogonal coordinates in the QAM signal vector plane shown in FIG. 2. These orthogonal coordinates of the received pilot tone vector RV are transferred to the signal processor unit SPU, whereas the orthogonal coordinates of the vectors representing all the other tones present in the DMT input signal are forwarded to the output terminal OT.

As is described later, the signal processor unit SPU calculates the phase angle difference Da between the received Pilot Tone vector RV and the expected pilot tone vector EV. The signal processor unit SPU further indicates by a high/low signal at the T3 output terminal that the received Pilot Tone vector RV is/is not located in the hatched intersection of the first and second zones shown in FIG. 2.

The signal processor unit SPU provides the above phase angle difference Da calculated for each symbol interval of the DMT input signal, to the averaging filter AVF which, accordingly, supplies an averaged phase angle difference ADa to the microprocessor P. ADa is the averaged value of Da over the last N symbol intervals for which the signal at the control terminal T4 of AVF was set high by the output terminal T3 of SPU. This means that a phase angle difference Da is ignored by the averaging filter AVF when the signal at T3 is set low by the signal processor unit SPU.

The microprocessor evaluates the averaged phase angle difference ADa and thereby generates a control voltage at its output terminal T5 and provides a control signal at its output terminal T6. The control voltage controls the output oscillator frequency of the VCO and the control signal is used by FFTU to compensate for the above mentioned misalignment of some predetermined sample instants with respect to the starting points of the symbol intervals. It is beyond the scope of the invention to describe how this control voltage and this control signal are determined from ADa, and how FFTU performs the compensation based on the control signal.

A more detailed description of the operation of the signal processor unit SPU is now given.

The first comparator and storage circuit CM1 compares the orthogonal coordinates of the vector RV supplied by FFTU, with the orthogonal coordinates of the corner points A,B,C,D,E and F of the first zone, these coordinates being stored (not shown) in CM1. When RV is/is not located in the first zone, the signal at the output terminal T1 of CM1 is set high/low. The circuit CM1 passes the coordinates of the vector RV to the conversion and storage circuit COM which calculates the phase angle difference Da between the expected pilot vector EV and the received pilot vector RV. The orthogonal coordinates of the vector EV are stored (not shown) in COM and the calculation of Da is straightforward for a person skilled in the art. The circuit COM passes the coordinates of the vector RV to the second comparator and storage circuit CM2 which compares Da with the values ±Damax. The output terminal T2 of CM2 is set high/low when the condition −Damax<Da<+Damax is/is not fullfilled. Thus, the signal at terminal T2 is set high/low if vector RV is/is not located in the second zone. The circuit CM2 finally forwards the calculated phase angle difference Da to the averaging filter AVF. The signals at terminals T1 and T2 are gated in the AND-gate AND and thus the signal at the terminal T3 is thus set high/low if the vector RV is/is not located in the intersection of the first and second zones.

To be noted that the above phase angle difference Da may be approximated using more simple calculations. For instance, when the vectors EV and RV are located in the first quadrant of the signal vector plane, Da≈+(X(EV)−X(RV))−(Y(EV)−Y(RV)); X(EV), Y(EV), X(RV) and Y(RV) being the X and Y coordinates of the vectors EV and RV respectively, in the signal vector plane. As a result, the two lines a and b may be parallel to the vector EV or secant in a point different from the origin of the signal vector plane. The advantage of this approximation is that the implementation of the conversion circuit COM is less complex.

While the principles of the invention have been described above in connection with specific apparatus, it is to be clearly understood that this description is made only by way of example and not as a limitation on the scope of the invention.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. Signal processor module (SPU, AVF) adapted to check if a vector (RV) representing a received signal is located in a predetermined zone of a signal vector plane, characterized in that said signal processor module (SPU, AVF) includes first checking means (CM1) for checking if said vector (RV) is located in a first zone (ABCDEF) delimited by successive orthogonal line segments, second checking means (CM2) for checking if said vector is located in a second zone (ab) delimited by two lines and gating means (AND) coupled to said first and second checking means for determining if said vector is located in said predetermined zone equal to an intersection zone of said first and second zones.

2. Signal processor module according to claim 1, characterized in that said checking of said first checking means (CM1) is for execution by comparing orthogonal coordinate values representing said vector (RV) with orthogonal coordinate values of corner points (A, B, C, D, E, F) of said first zone.

3. Signal processor module according to claim 2, characterized in that said signal processor module (SPU, AVF) further includes conversion means (COM) for intercoupling said first and said second checking means (CM1, CM2) and adapted for converting said orthogonal coordinate values of said vector (RV) to a phase angle value (Da) indicative of the phase angle difference between said vector (RV) and a predetermined vector (EV).

4. Signal processor according to claim 3, characterized in that said two lines comprise two secant lines that are secant in the origin of said signal vector plane and that said predetermined vector (EV) lies on a bissectrice of said two secant lines (a, b).

5. Signal processor module according to claim 4, characterized in that said checking of said second checking means (CM2) is for execution by comparing said phase angle value (Da) with a phase angle (Damax) between said bissectrice and one of said second lines, and with an opposite of said phase angle.

6. Signal processor module according to claim 5, characterized in that said first and said second checking means (CM1, CM2) have respective first and second control outputs (T1, T2) for indicating if said vector is located within said first and second zones, (ABCDEF, ab) respectively, and that both said control outputs are provided to said gating means for gating by said gating means (AND).

7. Signal processor module according to claim 6, characterized in that said signal processor module further includes averaging means (AVF) coupled to said second checking means and to an output of said gating means, said averaging means for averaging said phase angle value according to said output of said gating means.

* * * * *